Figure 1:
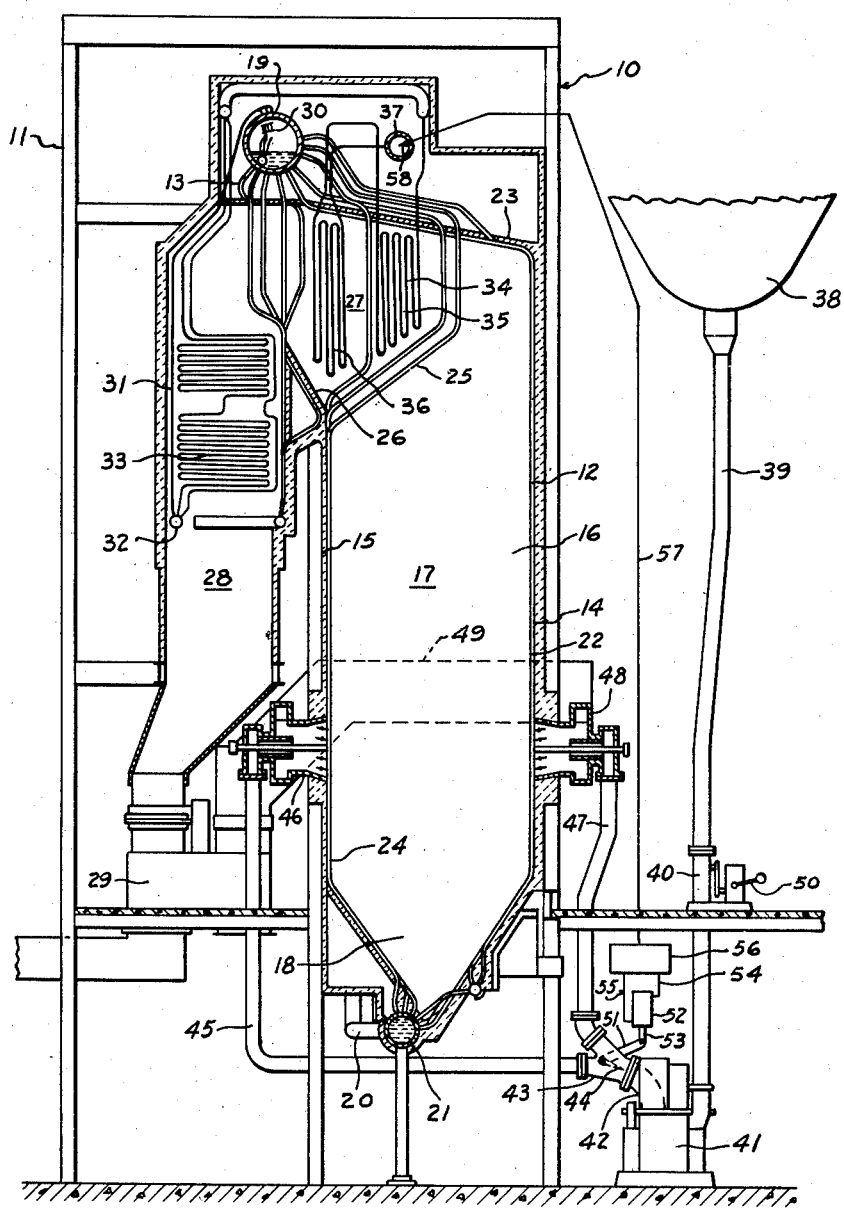

April 29, 1958 — O. CRAIG — 2,832,323
SUPERHEAT CONTROL
Filed Dec. 7, 1954 — 2 Sheets-Sheet 1

INVENTOR
OLLISON CRAIG
BY Norman S. Blodgett
ATTORNEY

April 29, 1958     O. CRAIG     2,832,323
SUPERHEAT CONTROL

Filed Dec. 7, 1954     2 Sheets-Sheet 2

INVENTOR
OLLISON CRAIG

BY *Norman S. Blodgett*
ATTORNEY

United States Patent Office 2,832,323
Patented Apr. 29, 1958

2,832,323

SUPERHEAT CONTROL

Ollison Craig, Worcester, Mass., assignor to Riley Stoker Corporation, Worcester, Mass., a corporation of Massachusetts Application December 7, 1954, Serial No. 473,658

2 Claims. (Cl. 122—478)

This invention relates to superheat control, and more particularly to a method and apparatus for regulating the final temperature of superheated steam leaving a steam generating unit.

In the generation of steam for use in power and the like, it is customary to pass steam which is at or near saturation into a heat exchange apparatus called a superheater in which the temperature of the steam is raised to a degree useful in the operation of the power turbine. At the present time it appears that superheat pressures and temperatures are increasing steadily and, as these requirements become greater, certain problems arise. For instance, as superheat temperature goes over 1000 degrees F., we begin to approach the temperature at which the mechanical properties of the metal in the superheater tubes fall off rapidly. Heretofore, it has been possible for metallurgists to come up with metals having higher and higher failure temperatures, but, nevertheless, it is necessary that the superheat temperature be maintained at a quantity just below the failure temperature of the metal. However, the major reason for accurate control of superheat is to maintain a constant temperature over a wide range of loads in order to obtain high turbine efficiency. Any extreme variation of this temperature, particularly in the upward direction, would result in the failure of the superheater tubes. Therefore, it is necessary to maintain very close control of the superheat temperature. This has been accomplished in the past by various methods such as the tilting of the burners in the furnace, the use of by-pass damper control, and the use of a de-superheater. All of these methods of superheat control have distinct disadvantages among which are high cost of apparatus and lack of control sensitivity. The present invention obviates these and other difficulties experienced with the prior art devices and methods in a novel manner.

It is therefore an outstanding object of the invention to provide a method and apparatus for maintaining a constant temperature of superheat over a large range of loads.

Another object of this invention is the provision of a method and apparatus for controlling superheat requiring a minimum of superheater tube surface.

It is another object of the present invention to provide a method and apparatus for the control of superheat having a high degree of sensitivity of control.

A further object of the invention is the provision of an apparatus for the control of superheat which is simple and inexpensive.

It is a still further object of this invention to provide a control for superheat which requires a minimum change in the prior art installations and designs of steam generating units.

With these and other objects in view as will be apparent to those skilled in the art, the invention resides in the combination of parts set forth in the specification and covered by the claims appended hereto.

Figure 2:
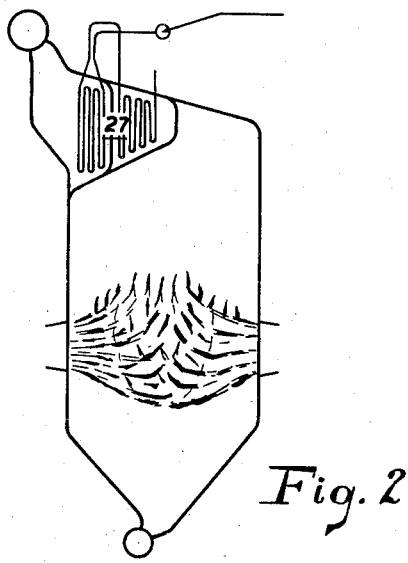
Figure 3:
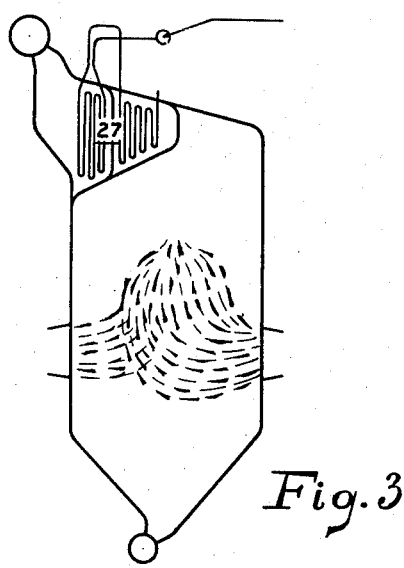
Figure 4:
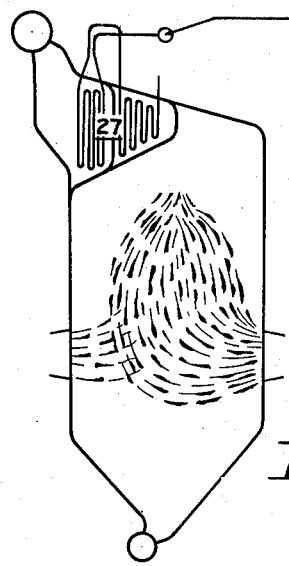

The character of the invention, however, may be best understood by reference to certain of its structural forms as illustrated by the accompanying drawings in which:

Figure 1 is a longitudinal sectional view of a steam generating unit embodying the principles of the present invention, and Figures 2, 3, and 4 illustrate schematically the operation of the invention under various conditions of load.

Referring first to Figure 1, wherein is best shown the general features of the invention, a steam generating unit, indicated generally by the reference numeral 10, is shown as comprising a supporting structure 11 on which is mounted a furnace 12 and a boiler 13. The furnace comprises a forward wall 14, a rear wall 15, and side walls 16 defining a combustion chamber 17. In its lower portion, the combustion chamber is provided with a hopper 18. The boiler 13 consists of a steam-and-water drum 19 connected by a large downcomer tube 20 to a header 21 situated at the apex of the hopper 18. A series of heat absorbing tubes extend upwardly from the header 21 and are connected to the steam release portion of the steam-and-water drum 19. For instance, tubes 22 originate in the header 21, extend upwardly along the forward wall of the hopper 18 and along the forward wall 14 of the furnace 12, and then extend along the lower surface of a furnace roof 23 before terminating in the steam-and-water drum 19. Other water wall tubes 24 originate in the header 21, extend along the back wall of the hopper 18, and up the back wall 15 of the furnace 12 and then extend diagonally across the upper portion of the combustion chamber 17 forming a screen 25 before terminating in the steam-and-water drum 19. The upper portion of the rear wall 15 of the furnace 12 is inclined rearwardly to form a sloping section 26. The area between the section 26 and the roof 23 of the furnace serves to define an upper pass 27. This pass terminates in the rearward portion a back pass 28 extending vertically downwardly and terminating in a regenerative air heater 29 which is connected to a stack, not shown.

The steam-and-water drum 19 contains steam purifying apparatus 30 of the usual type for removing entrained droplets of water and other foreign material from the steam. Tubes 31 are connected to the upper portion of the steam-and-water drum to receive the purified steam and are connected to a header 32 in the intermediate portion of the back pass 28. The header 32 is connected to the lower portion of a primary superheater 33 which extends upwardly in the back pass 28 and which is connected at its upper or discharge portion to the first section 34 of a secondary superheater 35 which lies in the upper pass 27. The coils in the first section 34 are arranged so that steam flow takes place toward the rear of the furnace, that is, in the direction of the flow of gases. At its rearward end, the first section 34 is connected to the rearward portion of a second section 36 of the secondary superheater 35. The coils of the second section 36 are arranged so that steam flow takes place forwardly; that is, counter to the flow of gases through the upper pass. At its forward or discharge end the second section 36 is connected to a superheated-steam header 37 situated above the roof 23 of the furnace. The header 37 is connected to provide steam to the turbine or other apparatus as required.

In the preferred embodiment, the fuel used is pulverized coal and for that purpose a bunker 38 is provided connected by a chute 39 to a coal feeder 40. The coal feeder 40 is connected to the input side of an attrition type pulverizer 41 having an exit pipe 42. The exit pipe 42 is connected to one leg of a Y-shaped fitting 43 which is provided with a dividing vane 44 pivotally mounted at the crotch of the Y. One leg of the fitting 43 is connected by a pipe 45 to a burner 46 situated on the rear wall 15 of the furnace 12, while the other leg of the fitting 43 is connected by a pipe 47 to a burner 48 situated on the forward wall 14 of the furnace 12. The burners 46 and 48 are of the intertube type, one such apparatus that may be used being shown in my co-pending patent application, Serial No. 299,888, filed July 19, 1952. In general, this type of burner provides a long, flowing flame. Each of the burners is connected by a duct 49 to the hot air exit of the air heater 29.

Means is provided for controlling not only the total amount of fuel supplied to the burners 46 and 48, but also the proportion in which the fuel is supplied to the respective burners. The fuel feeder 40 is provided with a control handle 50 by which the flow of fuel to the pulverizer 41 may be controlled by the operator as load changes. The dividing vane 44 is operatively connected by a link 51 to a control motor 52 which may be of the hydraulic type. The motor 52 has a reciprocating connecting rod 53 which is pivotally connected to the end of the link 51 away from the vane 44. Lines 54 and 55 are connected to the motor 52 to supply it with operating fluid, the amount of fluid supplied thereto being regulated by the controller 56 to which the lines 54 and 55 are connected. A line 57 connects the controller 56 to a temperature responsive device 58 residing in the superheated steam header 37.

The operation of the apparatus will now be clearly understood in view of the above description. Feed water enters the steam-and-water drum 19 and passes downwardly through the downcomer 20 into the header 21 from which it is distributed into the various tubes connected thereto. The water is passed upwardly through the tubes 22 and 24 and similar tubes where it receives heat by radiation convection from the furnace gases in the combustion chamber and elsewhere and is converted into steam. The steam is discharged into the steam-and-water drum 19, is purified in the apparatus 30, and passes outwardly through the tubes 31 into the header 32. The steam passes upwardly through the primary superheater 33 where it is initially superheated and the resulting product is carried into the header 32. The steam passes upwardly through the primary superheater 33 where it is initially superheated and the resulting product is carried into the secondary superheater 35. Steam passes in the same direction as the flow of gas through the first section 34 and then in counterflow through the second section 36 eventually being discharged into the superheated-steam header 37. The heat supplied to the first and second sections of the secondary superheater 35 is primarily by convection, although a certain amount of radiant heat is absorbed. Since this heat transfer is mostly by convection, it is axiomatic that the temperature of the steam arriving in the header 37 is dependent on the temperature of the gases passing through the upper pass 27. These gases, of course, originate in the combustion chamber 17 and it is the function of the burners 46 and 48 to provide these gases. The coal originating in the bunker 38 passes through the chute 39 through the feeder 40, where its rate of flow is regulated by the setting of the handle 50, and into the pulverizer 41. In the pulverizer the coal is reduced to a fine state and is mixed with a primary air, the resulting air-fuel mixture leaving the pulverizer through the pipe 42. The fuel-air mixture is divided by the dividing vane 44 so that some flows through the pipe 45 into the burner 46 and the remainder flows through the pipe 47 into the burner 48. The proportion into which the fuel is divided is determined by the setting of the vane 44. The fuel and air passes through the burners 46 and 48 and forms a flame, the flame, of course, being the visible indication of the process of combustion which results in the hot gases which pass over the superheater in the upper pass 27. Now, it is well-known that when a flame is produced which extends high up into the furnace, the exit gases from the furnace are considerably higher in temperature than when a flame is low in the furnace. When the dividing vane 44 is set in such a way that all or most of the fuel-air mixture goes to the burner 48, the flame from the burner 48 is a broad long flame extending upwardly through the furnace. This is a situation illustrated in Figure 4 and it results in extremely hot gases passing through the upper pass 27 and downwardly through the back pass 28. As the dividing vane 44 is changed so that a greater proportion of the fuel-air mixture passes through the burner 46, the flame originating in the burner 46 begins to impinge on that originating in the burner 48 and produces an increased turbulence therewith. This serves to reduce the length of the flame, as shown in Figure 3. The result is that a greater part of the combustion takes place in the lower part of the furnace and the gases passing into the upper pass 27 are cooler. As the dividing vane 44 is actuated still further so that eventually the amount of fuel passing to the burners 46 and 48 is equal, the flames are of equal intensity and they impinge upon one another with extreme turbulence in the manner indicated in Figure 2. The result of this is that burning takes place as low in the furnace as is possible and the gases passing into the upper pass 27 are as cool as possible. The applicant takes advantage of these effects by setting the total fuel feed to both burners by means of the handle 50 on the fuel feeder 40. This setting is determined by the amount of steam required at the turbines to supply the power necessary in a certain situation. The superheater is designed so that at full load the required superheat temperature is maintained by dividing the fuel equally between the opposed burners. At low load, when the temperature would normally drop off, the superheat is maintained at the desired level by reducing the fuel feed to one burner and increasing it to the other, thus raising the flame in the furnace. The total amount of fuel fed to the two burners will, of course, be lower than at full load. When the handle 50 is set for a full load operation, the temperature sensing device 57 in the header 37 sends a signal through the line 57 to the controller 56. The controller sends a signal through the lines 54 and 55 to the motor 52 in such a manner that the connecting rod 53 is extended by an amount sufficient to actuate the link 51 so that the vane 44 is set to divide the fuel-air mixture evenly between the burners 46 and 48. This will result in a flame of the type shown in Figure 2 and will give a low gas temperature in the upper pass. Since the superheater is designed to give the required steam temperature at this temperature of gas flow, the temperature of steam passing into the header 37 for use by the turbines will be exactly as required. When the handle 50 is set for a lower load, the drooping characteristic of the convention-type superheater will cause the temperature of the steam in the header 37 to drop. The device 58 will sense this and signal in a proper manner to the controller 56 which will operate through the motor 52 to cause the vane 44 to be set in such a position that the burner 48 will receive considerable more of the fuel-air mixture than the burner 46. This will result in the situation shown in Figure 3 where the flame from the burner 48 dominates the situation, even though modified somewhat by the flame originating in the burner 46 and the result is that the gases passing through the upper pass 27 will be at a higher temperature, thus resulting in a higher temperature of superheat passing into the header 37. When the handle 50 is set for a very low load operation of the steam generating unit, the temperature sensing device 58 will cause the vane 44 to be set in such a manner that almost all the fuel will pass to the burner 48, resulting in the situation shown in Figure 4, where the turbulence is low and the flame will rise high in the combustion chamber causing very hot gases to pass through the upper pass 27 and increasing the heat transfer to these superheater tubes in such a manner that the steam entering the header 37 will be at the required temperature. The effect of this sequence of events is to cause the temperature of gases leaving the furnace to be such as to produce a constant temperature of superheated steam over a wide range of load.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letter Patent is:

1. An apparatus for controlling the temperature of superheated steam in a steam generating unit comprising front, rear and side walls defining a vertically elongated combustion chamber, means defining a convection pass extending from the upper portion of one wall of the combustion chamber, a convection superheater disposed in the convection pass which superheater is designed to give the required temperature of superheat with a given temperature of combustion gas passing thereover at full load, water wall means lining said combustion chamber, at least two burners capable of providing elongated flames, the burners being situated on opposite walls so that the flames impinge directly on one another, one burner being on a wall opposite the wall from which the convection pass extends, means for supplying a total amount of fuel-air mixture to the burners in proportion to the load required of the unit, and control means for maintaining the proportion of fuel-air mixture at equal amounts for the two burners at full load to produce the said given temperature of gases passing over the superheater, said control varying the proportion of the fuel-air mixture to said burners to increase the amount of mixture supplied to the said one burner and decreasing the amount of mixture supplied to the other burner as the load is decreased, thereby the length of the paths of the gases is decreased and the temperature of gases passing over the convection superheater will be increased to maintain the superheat temperature at constant value.

2. An apparatus for controlling the temperature of superheated steam in a steam generating unit comprising front, rear and side walls defining a vertically elongated combustion chamber, means defining a convection pass extending from the upper portion of one wall of the combustion chamber, a convection superheater disposed in the convection pass which superheater is designed to give the required temperature of superheat with a given temperature of combustion gas passing thereover at full load, water wall means lining said combustion chamber, at least two intertube burners capable of providing elongated flames, the intertube burners being situated on opposite walls so that the flames impinge directly on one another, one burner being on a wall opposite the wall from which the convection pass extends, means supplying a total amount of fuel-air mixture to the burners in proportion to the load required of the unit, and control means for maintaining the proportion of fuel-air mixture at equal amounts for the two burners at full load to produce the said given temperature of gases passing over the superheater, said control means varying the proportion of the fuel-air mixture to said burners to increase the amount of mixture supplied to the said one burner and decreasing the amount of mixture supplied to the other burner as the load is decreased, whereby the length of the path of the gases is decreased and the temperature of gases passing over the convection superheater will be increased to maintain the superheat temperature at a constant value.

References Cited in the file of this patent

UNITED STATES PATENTS

| 1,647,727 | Daniels | Nov. 1, 1927 |
| 2,013,565 | Lundgren | Sept. 3, 1935 |
| 2,126,721 | Bucher | Aug. 16, 1938 |
| 2,245,209 | Mayo | June 10, 1941 |

FOREIGN PATENTS

| 277,543 | Great Britain | Sept. 22, 1927 |